Nov. 16, 1943.  J. PERINA  2,334,504
AIRCRAFT STRUCTURE
Filed Nov. 20, 1940   2 Sheets-Sheet 1
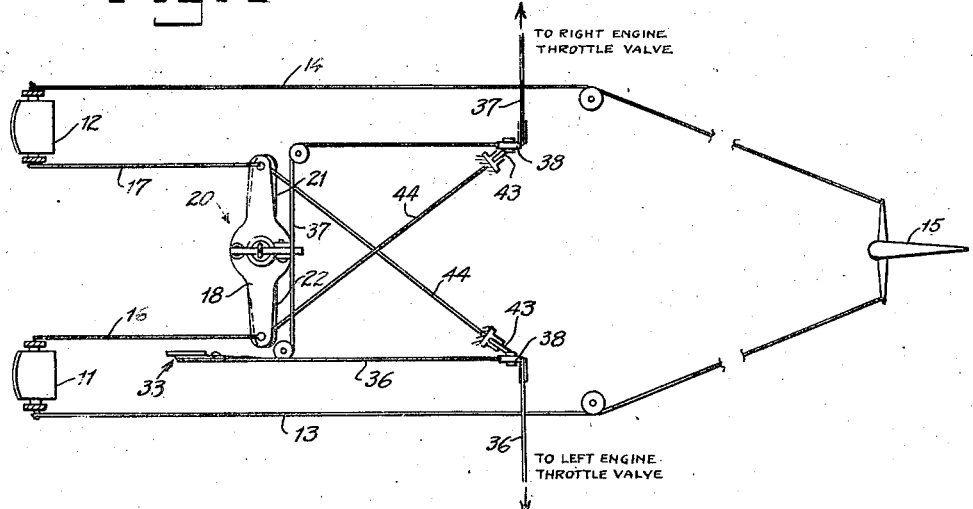
JOSEPH PERINA
INVENTOR
BY
Robert C Resch
ATTORNEY Nov. 16, 1943.  J. PERINA  2,334,504
AIRCRAFT STRUCTURE
Filed Nov. 20, 1940  2 Sheets-Sheet 2
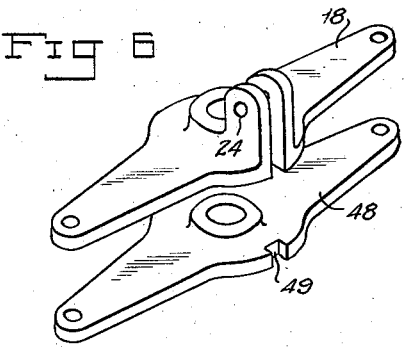
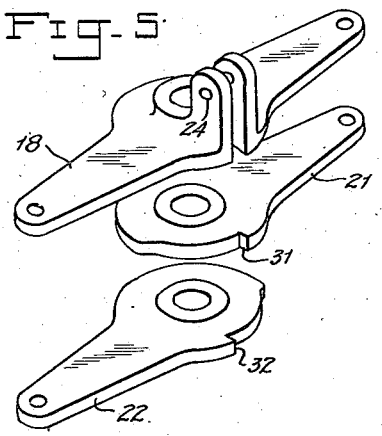
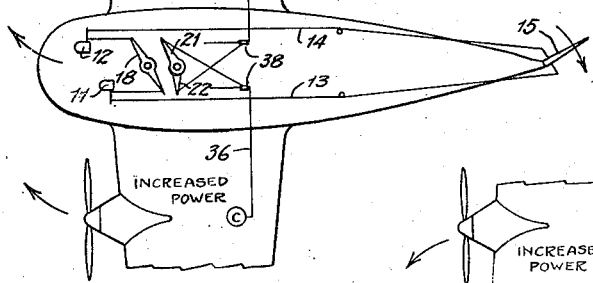
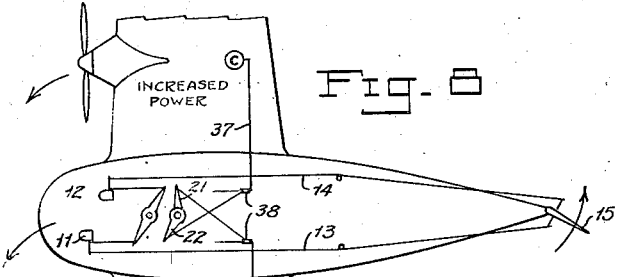
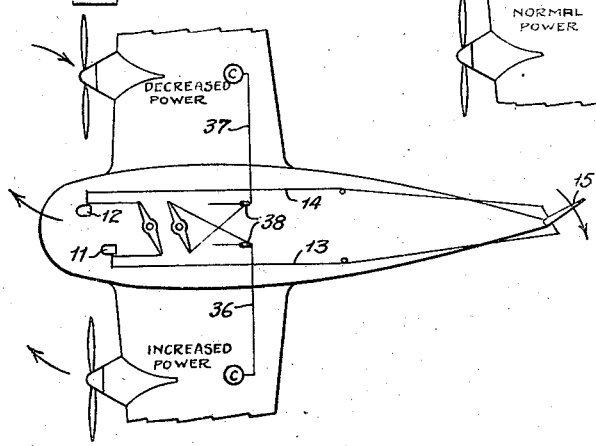
JOSEPH PERINA
INVENTOR
BY
Robert C. Rasche
ATTORNEY Patented Nov. 16, 1943

2,334,504

UNITED STATES PATENT OFFICE 2,334,504

AIRCRAFT STRUCTURE

Joseph Perina, Farmingdale, N. Y., assignor to Republic Aviation Corporation, a corporation of Delaware Application November 20, 1940, Serial No. 366,431

8 Claims. (Cl. 244—83)

This invention relates to auxiliary controls for facilitating the maneuvering on the ground of multi-engined aircrafts.

The main object of the invention is to increase the maneuverability of the aircraft, so as to enable the pilot to more rapidly vary the direction of travel on the ground, by momentarily coupling during taxiing the individual throttle controls of all the several propelling units of the aircraft to the means controlling the steering of the aircraft on the ground.

The invention contemplates use in aircraft having at least one propelling unit at each side thereof, of simple and reliably operative means for effecting a propulsion differential in the several propelling units concomitantly with the operation of the aircraft's control surfaces controlling the steering of the aircraft on the ground.

In its more specific aspect, the invention is operatively associated with the rudder control mechanism of the aircraft in which propulsion is provided by a throttle-controlled engine at each side of the plane of symmetry of the aircraft, mechanism, operable by the rudder control, being provided by which one of the engine throttles is further opened from its normal setting to increase the power of the corresponding engine over that of the other engine, according to the direction in which the aircraft is directed by the rudder control; the differential propulsion thus instituted being effective to assist the rudder in directing the aircraft on the ground.

In the drawings

Figure 1 is a plan view of the control mechanism of the invention, illustrating one embodiment which the invention may assume in practice.

Figure 2 is a side elevational view of the control mechanism shown in Figure 1.

Figure 3 is an enlarged detail view in plan of an intermediate lever unit of the control mechanism.

Figure 4 is a side elevation of the lever unit shown in Figure 3.

Figure 5 is an exploded perspective view of the several levers constituting the intermediate lever unit.

Figure 6 is a view similar to Figure 5 but showing a second embodiment of the invention.

Figures 7, 8 and 9 are schematic diagrams in plan of said two embodiments of the invention, showing the operating effect of the control mechanism on the aircraft, in each instance.

Referring more particularly to Figures 1 and 2, a typical control surface operating mechanism of an airplane is shown, including rudder pedals 11 and 12 operatively connected by members 13 and 14 to a steering rudder 15. The rudder pedals are each connected by links 16 and 17 to opposite ends of a two-arm lever or walking beam 18 forming part of a lever unit 20 of the control system. Through the action of lever 18, the pedals are caused to move alternately in a fore-and-aft direction of the airplane in the well-known manner, each pedal oscillating about its pivot 19. Thus, the pedals in association with the lever 18 constitute a manually operative control element, opposed members of which are adapted for alternate reciprocatory movement to oppositely actuate control surface elements of the aircraft, such as the rudder 15.

The lever unit 20, shown more clearly in Figures 3, 4 and 5, further includes two secondary levers 21 and 22 actuatable individually by the lever 18, through the medium of a lock dog 23 pivoted at 24 on the lever 18. The lock dog 23 has an arm 25 which extends from the lever pivot 24 across the levers 18, 21 and 22. A second arm 26 of the lock dog has a spring 27 acting thereon, tending to swing the lock dog to the disengaging position shown in dot-and-dash outline, the lock dog being releasably held in engaging position by means later described. Each of the levers 18, 21 and 22 is carried on a vertical shaft 28 extending from a base 29 fixedly mounted on the aircraft.

The levers 21 and 22 are each individually operative upon a throttle control mechanism of the left and right hand power plants of the aircraft. The lever unit 20 is so organized that when the lever 18 is swung in clockwise direction, as viewed in Figure 1, lever 22 is actuated while lever 21 remains inactive. When the lever 18 is swung counterclockwise, the opposite effect is had, lever 21 being actuated while lever 22 remains inactive. By such operation the power plant at one side of the aircraft has its propulsive effect increased while the other power plant remains at normal operation. As shown more clearly in Figure 5, the levers 21 and 22 are each provided with oppositely facing shoulders 31, 32 respectively, with which the arm 25 of the lock dog is adapted to engage when said lock dog is swung with the lever 18. The portion of the lever 21 opposite the shoulder 31 is cut away to provide a slot in which the lock dog arm 25 may freely move when revolving clockwise, without actuating the lever 21. The lever 22 is similarly cut away in an opposite direction to clear the arm 25 when moved counter-clockwise.

As shown in Figures 1 and 2, a regulator device or throttle control 33 is provided which includes a pivoted lever 34 for each individual engine (not shown) adapted to be set at various angular positions with reference to a fixed segment 35, suitable locking means cooperating with the segment 35 being provided to fix the selected position of the lever. A cable or link member 36, connected to one of the levers 34, extends therefrom over suitable guiding devices and is connected at its other end to the throttle valve of the left engine. A second cable or link member 37, connected to the other lever 34, passes over suitable guiding devices and is connected to the right hand engine throttle valve. When flexible cables are used for the link members 36, 37, each throttle valve may have a spring to return the throttle to closed position. By appropriately setting the levers 34, the speeds of both engines may be selected for the conventional operation of the aircraft.

The selected opening of either one of the throttle valves may be increased to accelerate the corresponding engine, by means now to be described, the engine throttle so operated being dependent upon the direction of operation of the rudder pedals 11, 12. This will be apparent from the diagram in Figure 7 in which the rudder pedals have been operated for a right turn, with the result that the left hand engine is operating at increased power, in that the throttle valve of said engine has been further opened by the rudder pedal operation. The other direction of operation of the rudder pedals 11, 12 is illustrated in Figure 8, showing the mechanism operated for a left turn.

The cables or links 36, 37 constitute operative connections, respectively, between the throttle control 33 and the throttle valve of each right and left engine. A sheave 38, over which the cable 36 travels, is movably mounted by means of a slide rod 39 on which the sheave is rotatably carried, the slide rod being guided in a frame 40, see Figure 2. A collar 41 fixed on the rod 39 has a spring 41a yieldably holding the sheave 38 in normal, raised position. A link 42, a bellcrank 43 and a second link 44 connect the slide rod 39 to the secondary lever 21.

The throttle cable 37 is similarly equipped, having a sheave 38 and associated mechanism operating therewith substantially as described for the cable 36, its link 44, however, being connected to the other secondary lever 22.

It will be seen that as the pedals 11, 12 are operated to maneuver on the ground the aircraft to the right, the lever 21, having its shoulder 31 engaged by the lock dog 23, swings with the lever 18 to draw one of the sheaves 38 downward, as viewed in Figure 2. This, in effect, reduces the effective length of the cable 36, or cable 37 as the case may be, with the result that the throttle valve controlled by said cable is further opened from the normal setting determined by the throttle control 33. In this manner the power of one of the engines is increased simultaneously with the operation of the rudder 15, the corresponding increase in propulsion at one side of the aircraft serving to augment the turning effect of the rudder on the aircraft.

To permit the use of flexible cables operating in tension, rather than heavier rigid links, for transmitting motion between the levers 21, 22, bellcranks 43 and the slide rods 39, it is required that the links 44 cross each other as shown. In this way the forward motion of the left pedal 11, to direct the aircraft to the left, is translated to the right hand throttle control to effect an acceleration of the right hand engine. Inversely, the forward motion of the right pedal 12 accelerates the left hand engine. If desired, this mode of operation may be had by crossing the links 16 and 17, in which case the links 44 may be arranged to issue rearwardly from the levers 21, 22 in substantially parallel relation.

The mechanism of the invention may be conditioned for conventional use of the rudder 15 independently of the power plant control, by releasing the lock dog 23 from engagement with the levers 21, 22, thus rendering the rudder pedals 11, 12 operable solely to control the rudder. As shown in Figure 2, cable 45, attached to the arm 26 of the lock dog 23, is connected to a hand lever 46 in the cockpit adapted to be set at either "on" or "off" position on a segment 47, provision being made to lock said lever in the "on" position at which the lock dog 23 is held against the tension of spring 27 to engage the levers 21, 22.

The modification of the invention shown in Figures 6 and 9 provides for instituting a differential propulsion by increasing the power of one engine while decreasing the power of the other. To accomplish this mode of operation, the lever unit 20 is modified by substituting a two-arm lever 48, see Figure 6, for the levers 21, 22 of the first form of the invention. The lever 48 may be coupled or uncoupled from the lever 18 by the swinging of the lock dog 23 which, in its engaging position, seats in a slot 49 of lever 48. The lever 48 is connected to the throttle control system by having the links 44 of the latter connected to each of its respective ends.

In this modification, each sheave 38 is arranged to be moved either upwardly or downwardly from a central, neutral position in order that movement of the sheave may effect either an acceleration or deceleration of the associated engine. The collar 41 on the slide rod 39 carrying the sheave is, therefore, normally away from the guide frame 40, when the sheave is in neutral position, the spring 42 being normally under tension to raise the sheave 38 to permit lowering of same as required. It will, therefore, be seen that as the lever 48 swings with lever 18, upon operation of the rudder pedals 11, 12, the sheave 38 at one side is raised while the sheave at the other side is lowered. Considering this operation in view of the showing of Figure 9, it will be seen that the throttle valve opening of the right hand engine is reduced to decrease the power of the engine, while the throttle valve of the left hand engine is further opened to increase the power of its engine. Thus, the propulsion of the right power plant is reduced while that of the left power plant is increased, both acting to augment the turning effect of the rudder on the aircraft.

Having now made certain the nature and purposes of my invention, and at least one mode of executing same, in such manner as to enable anyone skilled in the art to which it appertains, to make and use same, as required by the statutes. that which I claim as my property, and desire to secure by Letters Patent of the United States, is:

1. In a multiple engine aircraft having at least one propeller-equipped engine at each side thereof and a manually controlled throttle valve for each engine, the combination with a steering mechanism for maneuvering the aircraft, of means actuatable by said steering mechanism for increasing the throttle valve opening of the engine or engines on one side of the aircraft, according to the direction of operation of said mechanism, to thereby institute a propulsion differential between the respective left and right engines to assist in maneuvering the aircraft and pilot-operated release-mechanism operatively interconnecting said named means and said steering mechanism (whereby the pilot may connect and disconnect said means and said steering mechanism).

2. In a multiple engine aircraft having a propeller-equipped engine at each side thereof, a manually controlled throttle valve for each engine, and a linkage for controlling each throttle valve, the combination with a rudder mechanism for maneuvering the aircraft, of means actuatable by said rudder mechanism and effective then on one of said throttle linkages, for increasing the throttle valve opening of the corresponding engine, according to the direction of operation of said rudder mechanism, to thereby institute a propulsion differential between the respective engines to assist in maneuvering the aircraft and pilot-operated release-mechanism operatively interconnecting said last named means and said steering mechanism (whereby the pilot may connect and disconnect said means and said steering mechanism).

3. In a multiple engine aircraft having a propeller-equipped, throttle-controlled engine at each side thereof, in combination, a throttle control device and connections therefrom to each engine throttle, a foot operable control means having a pair of pedals adapted for alternate reciprocatory movement to operate the rudder of the aircraft, a pair of movable members, one for each engine throttle, each cooperative with one of said throttle connections and each adapted upon being moved to vary the effective length of said connection, and such an inverted operative connection between said pedals and said movable members that the relative throttle opening of both engines varies oppositely and concomitantly with the operation of the aircraft's rudder.

4. In a multiple engine aircraft having at least a propeller-equipped, throttle-controlled engine at each side thereof, in combination, a throttle control device and cable connections therefrom to each engine throttle, a foot operable control means having a pair of pedals, adapted for alternate reciprocatory movement to operate the rudder of the aircraft, a pair of sheaves, one for each of said cable connections, each mounted for movement transverse to the general direction of said connection and adapted upon movement during taxiing of the aircraft on the ground to vary the effective length of said connection, and such an inverted operative connection between said pedals and said sheaves that the throttle opening of the engines or engine located on one side of the aircraft increases concomitantly with and proportionately the steering operation of the aircraft's rudder on the opposite side of the aircraft.

5. In a multiple engine aircraft having at least a propeller-equipped, throttle-controlled engine at each side thereof, in combination, a throttle control device and connections therefrom to each engine throttle, a foot operable control means having a pair of pedals adapted for alternate reciprocatory movement to operate the rudder of the aircraft, a pair of movable members, one for each engine throttle, each cooperative with one of said throttle connections and each adapted upon being moved to vary the effective length of said connection, an inverted operative connection between said pedals and said movable members, and manually operable control means intermediate said inverted operative connection and said pedals for disconnecting said foot control means from said movable members.

6. In a multiple engine aircraft having a propeller-equipped, throttle-controlled engine at each side thereof, in combination, a throttle control device and cable connections therefrom to each engine throttle, a pair of rudder pedals, means associated with said rudder pedals for causing alternate reciprocatory movement thereof, a pair of sheaves, one for each of said cable connections, each mounted for movement transverse to the general direction of said cable connection and adapted upon movement to vary the effective length of said cable connection, and operative connections respectively between each one of said rudder pedals and each one of said sheaves, whereby the relative throttle opening of the engines is varied concomitantly with the operation of the aircraft's rudder.

7. In a multiple engine aircraft having a propeller-equipped, throttle-controlled engine at each side thereof, in combination, a throttle control device and cable connections therefrom to each engine throttle, a pair of rudder pedals, a two-arm lever connected at each arm to a respective one of said rudder pedals for causing alternate reciprocatory movement of said rudder pedals, a pair of secondary levers each having an oppositely facing shoulder, a member carried on said two-arm lever and engageable alternately with said shoulders during a reciprocatory movement of said two-arm lever, a pair of sheaves, one for each of said cable connections, each mounted for movement transverse to the general direction of said connection and adapted upon movement to vary the effective length of said connection, and a linkage between each one of said sheaves and each one of said secondary levers, whereby upon operation of said rudder pedals, the throttle opening of one engine is increased to institute a power differential between the respective engines.

8. In a multiple engine aircraft having a propeller-equipped, throttle-controlled engine at each side thereof, in combination, a throttle control device and cable connections therefrom to each engine throttle, a pair of rudder pedals, a two-arm lever connected at each arm to a respective one of said rudder pedals for causing alternate reciprocatory movement of said rudder pedals, a pair of secondary levers each having an oppositely facing shoulder, a member movably carried on said two-arm lever and normally engageable with said shoulders alternately during a reciprocatory movement of said two-arm lever, a pair of sheaves, one for each of said cable connections, each mounted for movement transverse to the general direction of said connections and adapted upon movement to vary the effective length of said connection, a linkage between each one of said sheaves and each one of said secondary levers, and manually operable means for moving said member out of engagement with said shoulders, whereby upon operation of said rudder pedals, the throttle opening of one engine is increased to institute a power differential between the respective engines.

JOSEPH PERINA.